J. G. CROZER.
REVERSIBLE SELF CLEANING RAKE.
APPLICATION FILED JAN. 28, 1914.
1,105,495.
Patented July 28, 1914.
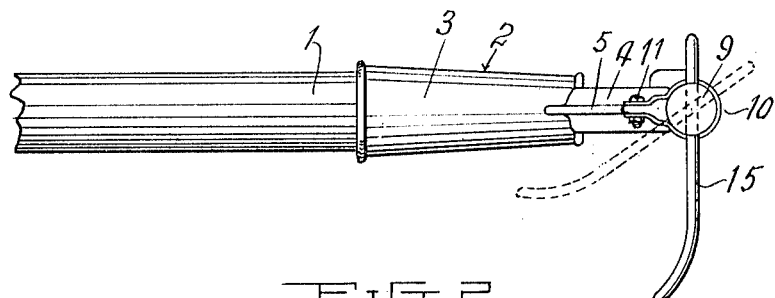
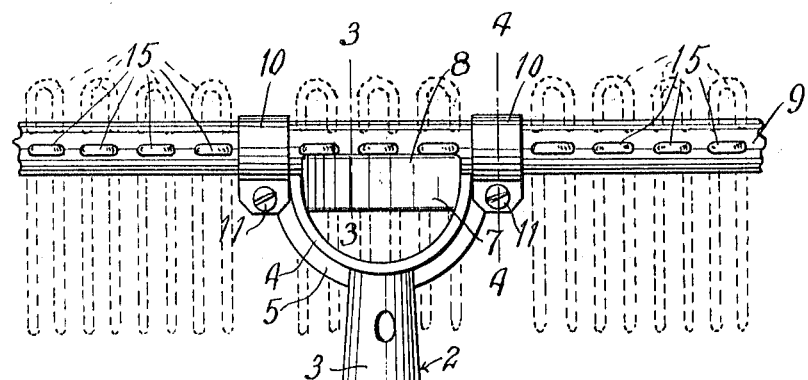
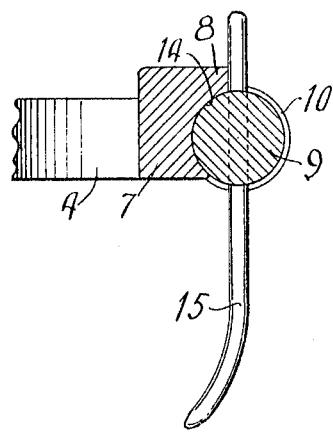
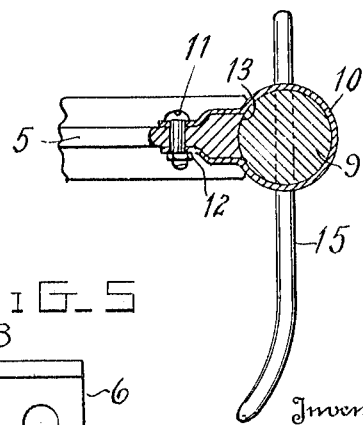
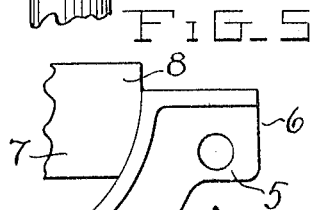
Witnesses
Charles H. Trotter
K. M. Smith
Inventor
J. G. Crozer
By N. Randolph Jr.
Attorney

UNITED STATES PATENT OFFICE.

JAMES G. CROZER, OF CEDAR RAPIDS, IOWA.

REVERSIBLE SELF-CLEANING RAKE.

1,105,495.  Specification of Letters Patent.  Patented July 28, 1914.

Application filed January 28, 1914. Serial No. 814,907.

*To all whom it may concern:*

Be it known that I, JAMES G. CROZER, a citizen of the United States, residing at Cedar Rapids, in the county of Linn and State of Iowa, have invented certain new and useful Improvements in Reversible Self-Cleaning Rakes; and I do hereby declare the following to be a full, clear, and exact description of the invention, such as will enable others skilled in the art to which it appertains to make and use the same.

The primary object of this invention is to provide a rake of extremely simple and practical construction, which will automatically clean itself when moved forward or away from the operator into position for a new stroke.

Another and more specific object of the invention is to provide a rake of this nature having a rotatable tooth carrying bar secured to the rake head, said head being so constructed as to hold the teeth in proper operative position when being drawn toward the operator and to allow the teeth to swing upwardly toward the head when moved away from the operator, so as to free itself of all accumulations.

As a further object, the invention contemplates the provision of a self-cleaning rake of a reversible nature, so that either end of the teeth may be employed, depending upon the character of the work to be performed.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation of my improved rake, the teeth being shown in inoperative position by dotted lines. Fig. 2 is a top plan view of the rake, with the teeth shown in two positions, Fig. 3 is a fragmentary section taken on the plane of line 3—3 of Fig. 2, Fig. 4 is a section taken on the plane of line 4—4 of Fig. 2, and Fig. 5 is a fragmentary bottom plan view of the rake head.

Referring in detail to the drawings, by numerals, 1 designates the rake head which is connected to the head, generally designated 2, comprising a socket 3 and curved bar 4 which forms in substance a fork. This bar is reinforced on its outer side by a central longitudinal rib 5 and has its terminals extended laterally, as indicated by the numeral 6. A stop block 7 is cast integrally with the bar 4 between the ends thereof and has its upper edge extended outwardly in advance of the lower edge to form a lip, indicated by the numeral 8. A tooth carrying bar 9, which is circular in cross section, is rotatably secured to the head 2 by a pair of straps 10. These straps are attached to the laterally extending portions 6 of the fork or bar 4 by bolts 11 and nuts 12. The bolts extend through registering openings formed in the terminals of the straps and in the rib 5, and the straps encircle the bar 9 to hold it in engagement with the concave outer faces 13 of the fork and the curved outer face 14 of the block 7. The teeth are formed by a plurality of U-shaped members 15 which extend transversely through the bar 9. These teeth extend some distance on each side of the bar 9, but have a greater portion of their length disposed on one side than on the other, as clearly shown in the drawings, so that they will normally hang in a vertical plane.

It will be noted that the lip 8 is engaged by the teeth which are disposed between the straps 10 and acts as a stop to limit the rotation of the bar 9 so as to hold the teeth in working position when the rake is being drawn toward the operator. When the rake is moved forwardly for another stroke, the resistance offered by the ground causes the teeth to swing rearwardly, as indicated by the dotted lines in Fig. 1, and allows them to discharge all accumulations. As soon as the working stroke is started, the teeth swing back into operative position, as shown by solid lines in the drawings. When it is desired to reverse the rake so as to use the bight portions of the U-shaped members, the necessary rearrangement of parts may be quickly made by detaching the straps 10 from the head, and turning the bar 9 so that the pointed ends of the teeth are uppermost.

From the foregoing description taken in connection with the accompanying drawings, it will be apparent that I have provided a reversible self-cleaning rake of strong and simple construction, and it will be understood that while I have shown and described the preferred embodiment of my invention, minor changes in construction, combination and arrangement of parts may be made without departing from the spirit and scope of the invention as claimed.

Having thus described my invention, I claim:—

In a reversible self-cleaning rake, a socket having a fork, a cylindrical tooth carrying bar extending transversely across the terminals of said fork, straps encircling said bar and removably connected to the fork to hold the bar thereagainst, a plurality of teeth extending transversely through the bar projecting on opposite sides thereof, and a stop block arranged between the arms of said fork having an outwardly projecting lip to receive the upper ends of certain of said teeth to limit the rotation of the bar in one direction during a working stroke.

In testimony whereof I affix my signature in presence of two witnesses.

JAMES G. CROZER.

Witnesses:
CHAS. F. BILLOU,
M. D. PORTER.

Copies of this patent may be obtained for five cents each, by addressing the "Commissioner of Patents, Washington, D. C."